US009970746B2

(12) United States Patent
Ma et al.

(10) Patent No.: US 9,970,746 B2
(45) Date of Patent: May 15, 2018

(54) DIFFUSIVE OPTICAL FIBER SENSOR AND COMMUNICATION DEVICE AND METHOD OF USE

(71) Applicant: Flextronics AP, LLC, San Jose, CA (US)

(72) Inventors: Jiayin Ma, Palo Alto, CA (US); Martin Walter John Burmeister, Stockton, CA (US)

(73) Assignee: Flextronics AP, LLC, San Jose, CA (US)

( * ) Notice: Subject to any disclaimer, the term of this patent is extended or adjusted under 35 U.S.C. 154(b) by 0 days. days.

(21) Appl. No.: 15/172,411

(22) Filed: Jun. 3, 2016

(65) Prior Publication Data
US 2017/0059304 A1    Mar. 2, 2017

Related U.S. Application Data

(60) Provisional application No. 62/210,303, filed on Aug. 26, 2015, provisional application No. 62/212,844, filed on Sep. 1, 2015, provisional application No. 62/214,362, filed on Sep. 4, 2015, provisional application No. 62/216,861, filed on Sep. 10, 2015.

(51) Int. Cl.
| | |
|---|---|
| *G01B 11/06* | (2006.01) |
| *G01B 11/14* | (2006.01) |
| *G01B 11/02* | (2006.01) |
| *G02B 6/02* | (2006.01) |
| *G02B 6/28* | (2006.01) |

(52) U.S. Cl.
CPC .............. *G01B 11/14* (2013.01); *G01B 11/02* (2013.01); *G02B 6/02342* (2013.01); *G02B 6/2821* (2013.01)

(58) Field of Classification Search
CPC ...... G01B 11/14; G01B 11/02; G02B 6/2821; G02B 6/02342
USPC ................... 356/634, 237.2–237.6
See application file for complete search history.

(56) References Cited

U.S. PATENT DOCUMENTS

| | | | |
|---|---|---|---|
| 4,257,672 A | 3/1981 | Balliet | |
| 5,675,151 A * | 10/1997 | Oka | ........................ G01T 1/201 250/366 |
| 5,780,856 A * | 7/1998 | Oka | ........................ G01T 1/203 250/366 |
| 6,272,269 B1 | 8/2001 | Naum | |
| 6,671,451 B1 * | 12/2003 | Sugihara | ................... G01T 1/20 385/12 |
| 7,621,677 B2 | 11/2009 | Yang et al. | |
| 2002/0186921 A1 | 12/2002 | Schumacher et al. | |
| 2006/0056772 A1 | 3/2006 | Keller | |

(Continued)

OTHER PUBLICATIONS

Kozai et al. "Use of Diffusive Optical Fibers for Plant Lighting," International Lighting in Controlled Environments Workshop, 1994, T.W. Tibbitts, Editor, NASA-CP-95-3309, 6 pages [retrieved online from: http://www.controlledenvironments.org/Light1994Conf/6_8_Kozai/Kozai%20Fiber%020text.htm].

(Continued)

*Primary Examiner* — Isiaka Akanbi
(74) *Attorney, Agent, or Firm* — Sheridan Ross P.C.

(57) ABSTRACT

Techniques for fiber optic light sensing and communication are provided. Specifically, systems and methods to provide diffusive optical fiber sensors and communication devices and methods of use are disclosed.

14 Claims, 5 Drawing Sheets

(56) References Cited

U.S. PATENT DOCUMENTS

| | | |
|---|---|---|
| 2007/0031089 A1 | 2/2007 | Tessnow et al. |
| 2008/0131836 A1 | 6/2008 | Rueggeberg |
| 2017/0018957 A1 | 1/2017 | Lucrecio et al. |
| 2017/0019180 A1 | 1/2017 | Lucrecio et al. |
| 2017/0059763 A1 | 3/2017 | Lucrecio et al. |
| 2017/0070292 A1 | 3/2017 | Lucrecio et al. |

OTHER PUBLICATIONS

Wetzel "Coupling light emitting diodes to multimode optical fibers," Lehigh University, 1993, 20 pages.

"Light-emitting Diode (LED)," Fiber-Optincs.lnfo, 2015, 7 pages [retrieved online from: www.fiber-optics.info/articles/light-emitting_diode_led].

"Fermat's principle," Wikipedia, last updated Feb. 12, 2016, 4 pages [retrieved online from: en.wikipedia.org/wiki/Fermat's_principle].

Official Action for U.S. Appl. No. 14/942,210, dated Oct. 5, 2017, 15 pages.

* cited by examiner

DIFFUSIVE OPTICAL FIBER SENSOR AND COMMUNICATION DEVICE AND METHOD OF USE

CROSS REFERENCE TO RELATED APPLICATIONS

The present application claims the benefits of and priority, under 35 U.S.C. § 119(e), to U.S. Provisional Application Ser. Nos. 62/210,303, filed on Aug. 26, 2015, entitled "Diffusive Optical Fiber as Ambient Light Sensors, Optical Signal Transceiver, Proximity Sensor," 62/212,844, filed on Sep. 1, 2015, entitled "Diffusive Optical Fiber as Ambient Light Sensors, Optical Signal Transceiver, Proximity Sensor," 62/214,362, filed on Sep. 4, 2015, entitled "Laser Charging and Optical Bi-Directional Communications Using Standard USB Terminals," 62/216,861, filed on Sep. 10, 2015, entitled "Diffusive Optical Fiber as Ambient Light Sensors, Optical Signal Transceiver, Proximity Sensor," the entire disclosures of which are hereby incorporated by reference, in their entirety, for all that they teach and for all purposes.

This application is also related to U.S. patent application Ser. No. 14/937,553, filed on Nov. 10, 2015, entitled "Laser and Optical Charging and Communications Device and Method of Use," Ser. No. 14/942,210 filed Nov. 16, 2015, entitled "LED and Laser Light Coupling Device and Method of Use," Ser. No. 15/134,084, filed on Apr. 20, 2016, entitled "Optical Communication and Charging Device and Method of Use," and Ser. No. 15/134138, filed Apr. 20, 2016, entitled "Audio Transmission and Charging System and Method of Use," the entire disclosures of which are hereby incorporated by reference, in their entirety, for all that they teach and for all purposes.

FIELD

The disclosure relates generally to fiber optics, such as diffusive optical fiber sensors and communication devices and methods of use.

BACKGROUND

Optical fiber is conventionally employed to guide and propagate optical waves along or between fiber ends. A common implementation involves fitting or coupling one or both ends of an optical fiber with a light source, such as an LED or laser diode. Traditional optical fiber, aka "normal" optical fiber, keep photons of a light source within the optical fiber, typically by encasing a cylindrical core of a dielectric material with cladding. The photons remain within the fiber optic because the refractive index of the core is greater than that of the cladding.

In contrast, a diffusive optic fiber allows some photons to escape the fiber optic core through intentional imperfections in the cladding. The fiber optic may then serve as a thin line light source, when one or both ends of the optical fiber are fitted with a light source. The cladding imperfections may be formed by any of several means, such as by surface imperfections on the fiber surface or by material imperfections of the fiber (e.g. as provided by the Corning Fibrance™ product). With increasing randomness and quantity of imperfections, the illumination pattern becomes uniformly omnidirectional.

One unnoticed, yet important, feature of diffusive optic fiber is the ability of external light to enter the diffusive fiber optic (by way of the aforementioned imperfections) in addition to light escaping or departing the diffusive fiber optic. Such a corollary is provided through the optical path reverse principle. If a particular diffusive optic fiber produces a uniformly omnidirectional illumination, then the same diffusive optic fiber will also receive optical signals, energy or photons omnidirectionally from the ambient or external environment into the diffusive optical fiber through the fiber surface (e.g. by way of imperfects in the cladding). In recognition of this discovery, a diffusive optical fiber (aka optical waveguide or fiber waveguide) may be used as an omnidirectional ambient/external light sensor. In such a configuration, optical detectors could be placed at fiber ends to detect optical signal and/or energy from the surrounding environment. The optical energy or signal received may be any optical band, to include visible and infrared; IR sensing may be particularly suited to sensing of fires.

Techniques for fiber optic light sensing and communication are provided. Specifically, systems and methods to provide diffusive optical fiber sensors and communication devices and methods of use are disclosed.

By way of providing additional background, context, and to further satisfy the written description requirements of 35 U.S.C. § 112, the following references are incorporated by reference in their entireties: U.S. Pat. Pub. Nos. 2007/0031089 to Tessnow and 2002/0186921 to Schumacher, U.S. Pat. No.6,272,269 to Naum and U.S. Pat. No. 7,621, 677 to Yang, and "Use of Diffusive Optical Fibers for Plant Lighting" by Kozai, as found in "International Lighting in Controlled Environments Workshop," Tibbitts, Editor, NASA-CP-95-3309 (1994).

SUMMARY

Systems and methods to provide diffusive optical fiber sensors and communication devices and methods of use are disclosed.

In one embodiment, an optical fiber sensor system is disclosed, the system comprising: an optical fiber comprising a first end, a second end, and an external surface forming an aperture between the first end and the second end, the optical fiber configured to receive an external light from an external light source through the external surface at a first axial distance along the external surface; a first detector disposed at the first end and configured to measure a first external light power; a second detector disposed at the second end and configured to measure a second external light power; and a processor configured to compare the first and the second external light power measurements and determine the first axial distance.

In another embodiment, a method of fiber optic sensing of a light source is disclosed, the method comprising: providing an optical fiber sensor system comprising: an optical fiber comprising a first end, a second end, and an external surface forming an aperture between the first end and the second end, the optical fiber configured to receive an external light from an external light source through the external surface at a first axial distance along the external surface; a first detector disposed at the first end; a second detector disposed at the second end; and a processor; receiving the external light through the external surface at a first axial distance along the external surface; measuring, by the first detector, a first external light power; measuring, by the second detector, a second external light power; comparing, by the processor, the first and the second external light power measurements; and determining, by the processor as enabled by the external light power measurement comparison, the first axial distance.

In some alternative embodiments, the device and/or method of use further comprises: the optical fiber is a diffusive optical fiber; the optical fiber forms a circular axial cross-section; wherein the first end is a first terminus of the optical fiber and the second end is a second terminus of the optical fiber; wherein the optical fiber is a homogeneous optical fiber of circular axial cross-section; a second optical fiber configured to receive the external light through a second external surface at a second axial distance along the second external surface, a pair of detectors disposed at opposite termini of the second optical fiber, each of the pair of detectors configured to measure external light power, the processor further configured to compare the external light power measurements of the pair of detectors to determine the second axial distance; wherein each of the first optical fiber and the second optical fiber form longitudinally straight structures, and are disposed orthogonally to one another, wherein a two-dimensional position of the external light source may be determined by the processor; a third optical fiber configured to receive the external light through a third external surface at a third axial distance along the third external surface, a pair of detectors disposed at opposite termini of the third optical fiber, each of the pair of detectors configured to measure external light power, the processor further configured to compare the external light power measurements of the pair of detectors to determine the third axial distance; wherein the third optical fiber forms longitudinally straight structures disposed orthogonally to each of the first and the second optical fibers, wherein a three-dimensional position of the external light source may be determined by the processor; and a pair of transceivers disposed at each terminus of the optical fiber, the pair of transceivers configured to receive an optical signal from the external light source and to transmit an optical signal to the external light source.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figures 1A, 1B:
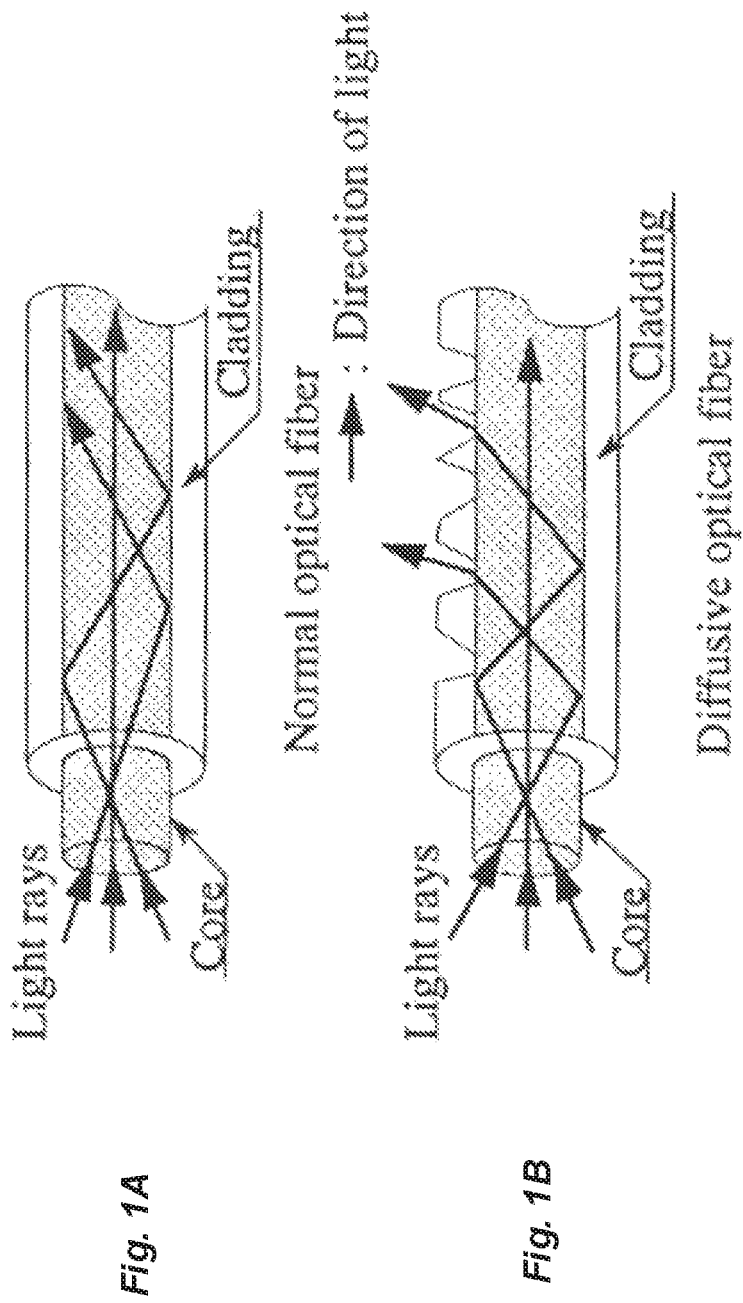
FIG. 1A provides a representation of a normal optical fiber of the prior art.
FIG. 1B provides a representation of a diffusive optical fiber of the prior art.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 100 | System |
| 200 | Light source |
| 210 | Light source light (L) |
| 220 | Light source two |
| 230 | Light source two light |
| 300 | Diffusing optical fiber |
| 304 | Fiber external surface |
| 310 | Fiber first end |
| 320 | Fiber second end |
| 400 | Photo detector |
| 500 | Signal processor/controller |
| $DX_1$ | Detected light power $X_1$ |
| $DX_2$ | Detected light power $X_2$ |
| $DY_1$ | Detected light power $Y_1$ |
| $DY_2$ | Detected light power $Y_2$ |
| $DZ_1$ | Detected light power $Z_1$ |
| $DZ_2$ | Detected light power $Z_2$ |
| FE | Light source fiber entry point |
| FEX | Light source fiber entry point X axis |
| FEY | Light source fiber entry point Y axis |
| FEZ | Light source fiber entry point Z axis |
| FX | Fiber X axis |
| FXL | Fiber X axis length |
| FY | Fiber Y axis |
| FYL | Fiber Y axis length |
| FZ | Fiber Z axis |
| FZL | Fiber Z axis length |
| LSX | Light source X axis component |
| LSXD | Light source X distance |
| LSY | Light source Y axis component |
| LSYD | Light source Y distance |
| LSZ | Light source Z axis component |
| LSZD | Light source Z distance |
| $LX_1$ | Light distance $X_1$ |
| $LX_2$ | Light distance $X_2$ |
| $LY_1$ | Light distance $Y_1$ |
| $LY_2$ | Light distance $Y_2$ |
| $LZ_1$ | Light distance $Z_1$ |
| $LZ_2$ | Light distance $Z_2$ |

DETAILED DESCRIPTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "LED" means Light-Emitting Diode and refers to a semiconductor that converts an electrical current into light, and includes all available LEDs types such as surface-emitting LEDs and edge-emitting LEDs.

The term "light coupling" means providing or supplying light to or into a fiber.

The term "waveguide" means a structure that guides waves of light.

The term "coupling efficiency" means the efficiency of power transfer between two optical components.

The term "fiber optics" or "optical fiber" means a flexible, transparent fiber made by drawing glass/silica or plastic.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Generally, the disclosure provides a proximity sensor to detect a light source position in one, two or three dimensions are constructed from one or more diffusive optical fibers, with homogenous diffusive media, and paired calibrated photo detectors at each end of the optical fiber(s). Light travels from a light source and enters into a particular diffusive fiber through the fiber surface. Then, through the optical diffusion process within the fiber media, light reaches each fiber end eventually. The projected distances from the light source to the two fiber ends is proportional to the optical powers received at the two detectors, that is distance to first fiber end times light power at first fiber end equals distance to second fiber end times light power at second fiber end. Knowing the locations of the fiber ends, the projected location of the light source can be calculated. The same method may be applied to in two or three dimensions with multiple fibers in orthogonal orientations. With multiple fibers and designed non-homogenous diffusive fibers, multiple light source locations may be detected as well as their relative motions. Applications of the disclosure may be used, for example, in applications requiring a distributed array of optical sensors that might traditionally employ large numbers photodiode or CCD devices.

FIGS. 1A-B provides a representation of a normal optical fiber and a diffusive optical fiber, respectively, of the prior art. In FIG. 1A, all light rays are contained within the core of the optical fiber through consistent and comprehensive internal reflection off the cladding. In FIG. 1B, some light rays emerge out from the core of the optical fiber, through gaps or imperfections in the cladding. In principle, the disclosure involves light traveling or propagating in the opposite direction from that of FIG. 1B, i.e. light entering the optical fiber by way of gaps or imperfections in the cladding.

With attention to FIGS. 2-5, embodiments of the optical fiber sensor system 100 and method of use are depicted.

Generally, the optical fiber sensor system 100 comprises a light source 200, diffusing optic fiber 300, a pair of photo detectors 400 disposed at each end of the optic fiber 300, and a signal processor/controller 500. Light source 200 emits light source light 210 (L) which impacts or is received by diffusing optic fiber 300 through a gap or imperfection in the fiber external surface 304. (In FIG. 2, light source light 210 is received at light source fiber entry point FE). Not all light emitted from an ambient or external light source enters optical fiber 300. Commonly, most light emitted from a light source enters diffusive fiber optic at a normal incidence angle relative to the fiber optic, that is, at a right angle to the longitudinal axis of the fiber angle (as shown, e.g., by light source light 210 entering fiber optic at FEX in FIG. 3).

Diffusing optic fiber 300 may receive light or an optical signal/energy from more than one light source, e.g. from light source 200 as well as from light source two 220 which emits light source two light 230. Diffusing optic fiber 300 receives light from an external (or ambient) source, such as light source 200 and/or light source two 220, through a surface imperfection (termed light source fiber entry point FE) wherein the light enters and travels to each end of the fiber optic 300. Diffusing optic fiber 300 comprises fiber external surface 304, fiber first end 310 and fiber second end 320. A pair of photo detectors 400 are disposed at each of fiber first end 310 and fiber second end 320; each of the pair of photo detectors 400 measure or detect a light power level, of respective first and second ends of optic fiber, of $DX_1$ and $DX_2$.

Figure 3:
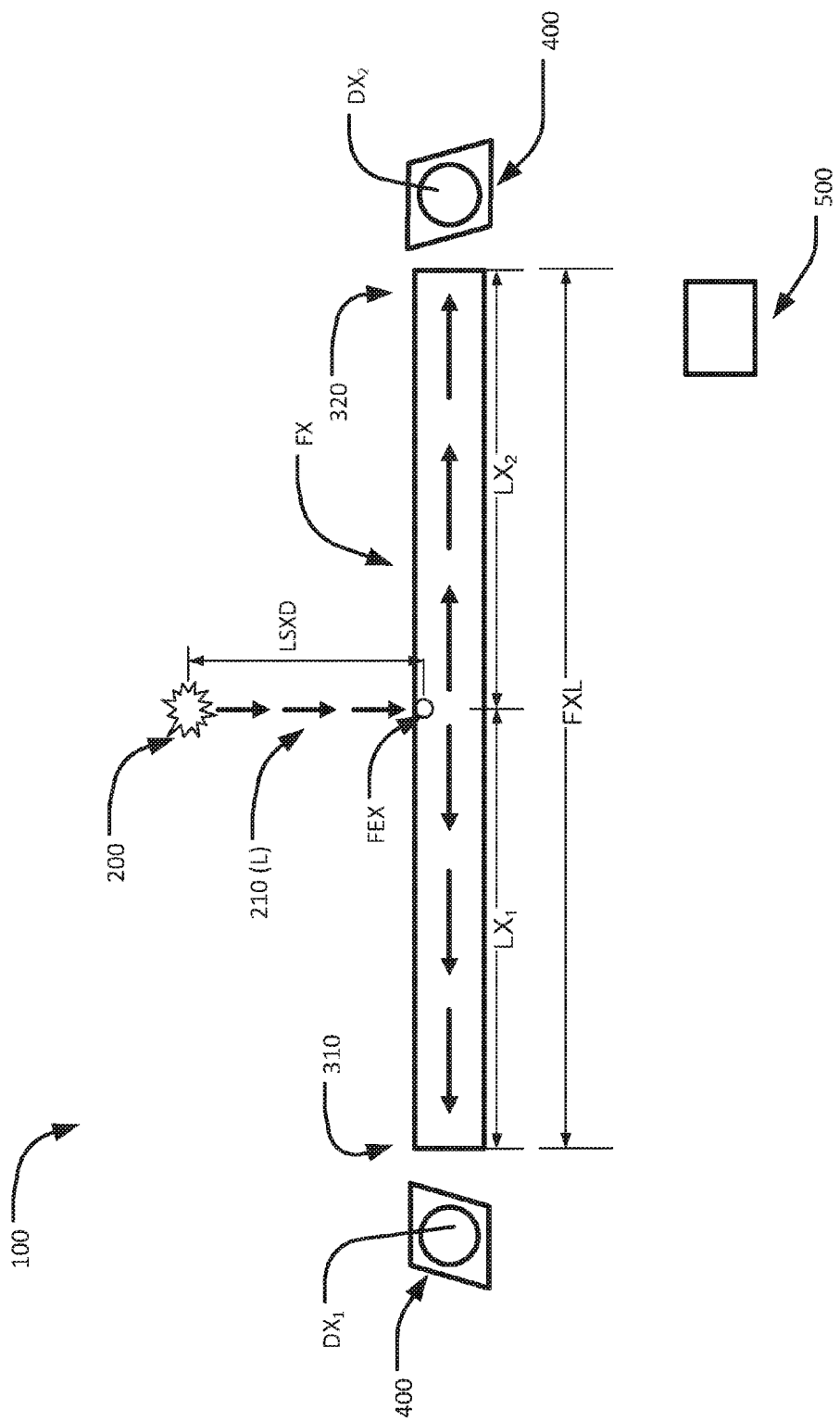
FIG. 3 provides further details of the optical fiber sensor system of FIG. 2.

With attention to FIG. 3, the determination of light source X distance LSXD (and/or axial location of FEX) of light source 200 is described. Light source 200 emits light source light 210, at least some of which strikes optical fiber 300 and enters optical fiber at light source fiber entry point X axis FEX. The light which so enters at FEX travels or propagates in each (opposite) direction down optical fiber 300, eventually reaching each of optical fiber first end 310 and optical fiber second end 320. The distance the light source light 210 travels, from FEX to respective fiber first end 310 and to fiber second end 320 is light distance $X_1$, ie $LX_1$, and light distance $X_2$, ie $LX_2$, respectively. The distance from light source 200 to optical fiber 300 is light source X distance LSXD. In order to estimate LSXD (or FEX), measurements of the power received at each of the first and second ends 310, 320 are obtained by photo detectors 400. Each of the photo detectors 400, disposed at fiber first end 310 and fiber second end 320, measure a detected light power $DX_1$ and detected light power $DX_2$, respectively. Physics of light provide that: $(LX_1) \times (DX_1)$ is proportional to $(LX_2) \times (DX_2)$. Geometry of the optic fiber 300 provide that total length of x axis optical fiber $FX = (LX_1) + (LX_2)$. Thus, these two equations may be solved for each of $LX_1$ and $LX_2$ and therefore location of FEX. Values of one or more of $DX_1$ and $DX_2$ (alone, in summation, or as a ratio), may be used to compute LSXD. For example, LSXD may be correlated with total power received at each of first and send fiber optic ends. Such correlation may be determined by calibration of known light sources and known distances LSXD for a given FEX. The above calculations are performed by signal processor/controller 500.

The principle of locating light source 200 in one (X) direction, as described with respect to FIG. 3, may be extended to three dimensions by addition of two optical fibers positioned or disposed orthogonally to the first optical fiber. That is, a set of three optical fibers forming a Cartesian reference system X-Y-Z may be configured to determine a location of a light source in three dimensions.

Figure 4:
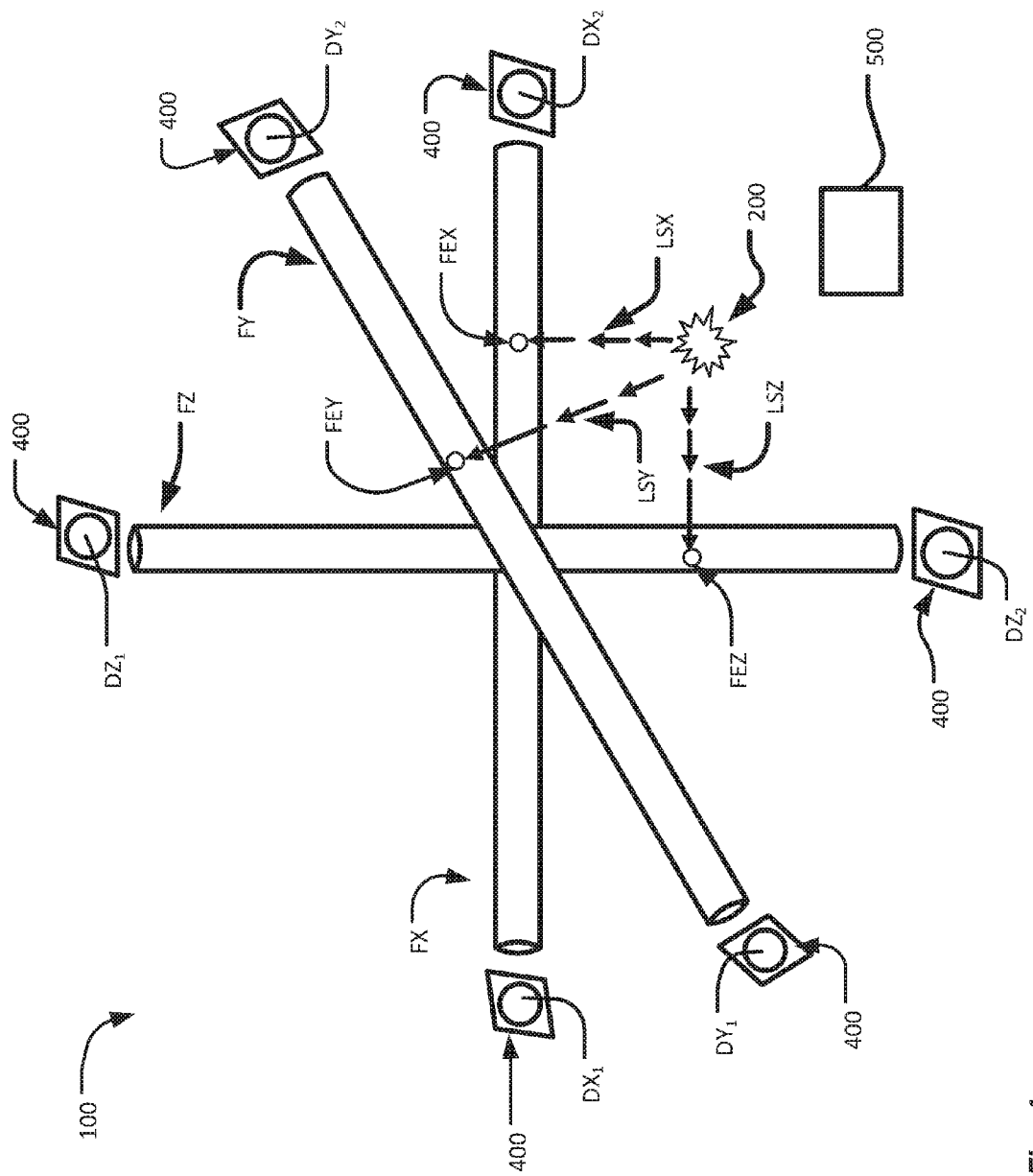
FIG. 4 provides further details of the optical fiber sensor system of FIG. 2.

More specifically, with focus on FIG. 4, three optical fibers, FX, FY and FZ, are arranged orthogonally to one another, each with respective light source axial entry point FEX, FEY and FEZ. Light enters each respective axial entry point and axially propagates to each end of the optical fiber wherein the light strikes a photo detector which measures, among other things, light power. More specifically, light source 200 emits light in any of several directions, which may be mathematically constructed as a vector in three orthogonal directions, i.e. an x-axis component of LSX, a y-axis component LSY and a z-axis component LSZ. Each of these three components LSX, LSY and LSZ enter respective optical fibers FX, FY and FZ at respective locations FEX, FEY and FEZ and bifurcates or splits so to propagate to each respective optical fiber end. That is, light source x axis component LSX enters fiber x axis FX at light source fiber entry point x axis FEX and propagates to each end, eventually striking a photo detector positioned at each end, wherein respective light power measurements of detected light power $DX_1$ and $DX_2$ are measured. Similarly, light source y axis component LSY enters fiber y axis FY at light source fiber entry point y axis FEY and propagates to each end, eventually striking a photo detector positioned at each end, wherein respective light power measurements of detected light power $DY_1$ and $DY_2$ are measured. Also, light source z axis component LSZ enters fiber z axis FZ at light source fiber entry point z axis FEZ and propagates to each end, eventually striking a photo detector positioned at each end, wherein respective light power measurements of detected light power $DZ_1$ and $DZ_2$ are measured.

Figure 2:
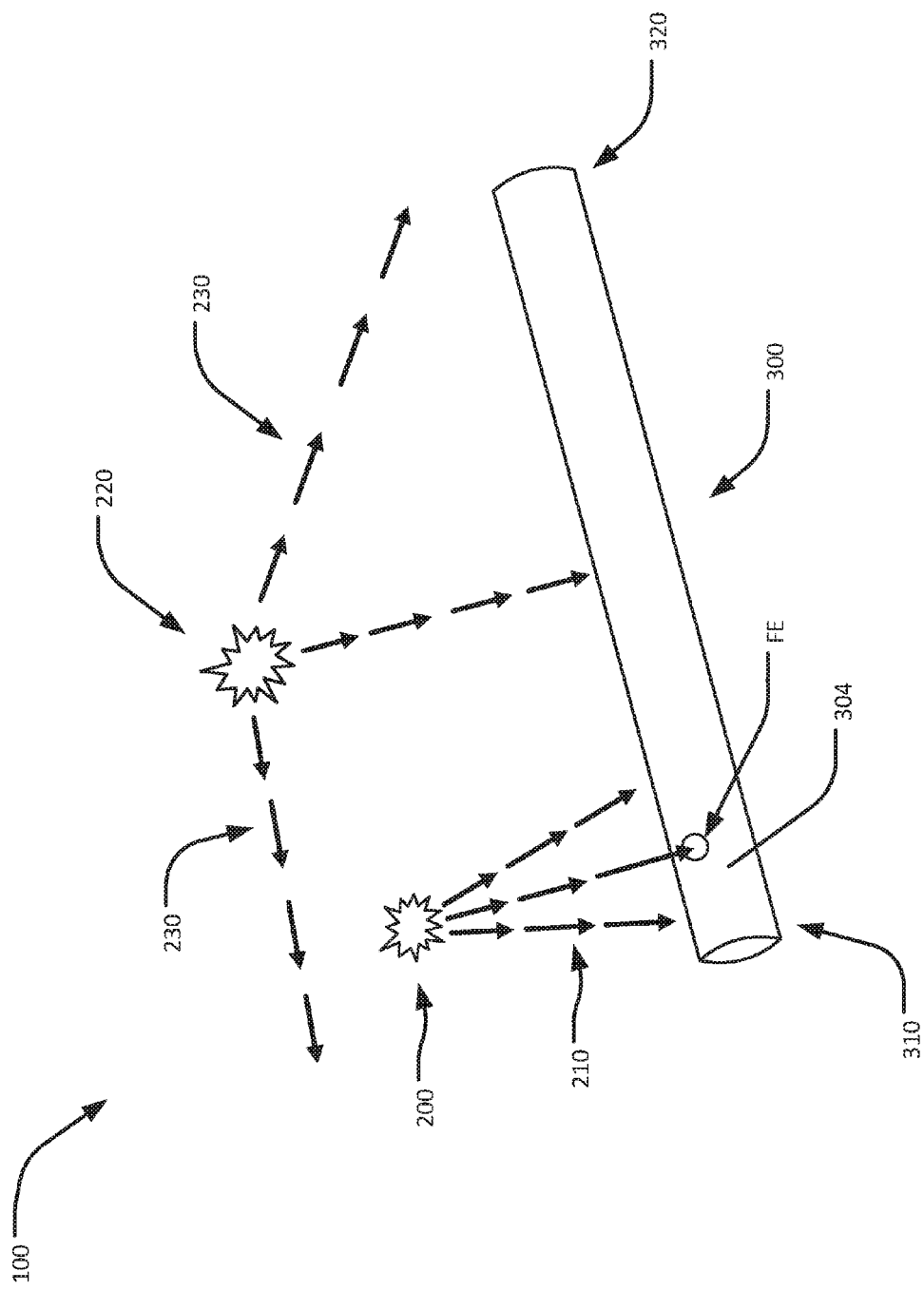
FIG. 2 provides a representation of one embodiment of the optical fiber sensor system.

Each pair of light power measurements, for a given fiber optic FX, FY and FZ, are then used to determine the respective locations of FEX, FEY and FEZ, as described above for the one axis optic fiber embodiment of FIGS. 2 and 3. Similarly, as described above with regard to the single optical fiber configuration of FIGS. 2 and 3, correlation may be performed given photo detector measurements to determine light source x distance LSXD (perpendicular or orthogonal distance from light source 200 to fiber x axis FX), light source y distance LSYD (perpendicular or orthogonal distance from light source 200 to fiber y axis FY) and light source z distance LSZD (perpendicular or orthogonal distance from light source 200 to fiber z axis FZ). The above calculations are performed by signal processor/controller 500.

Figure 5:
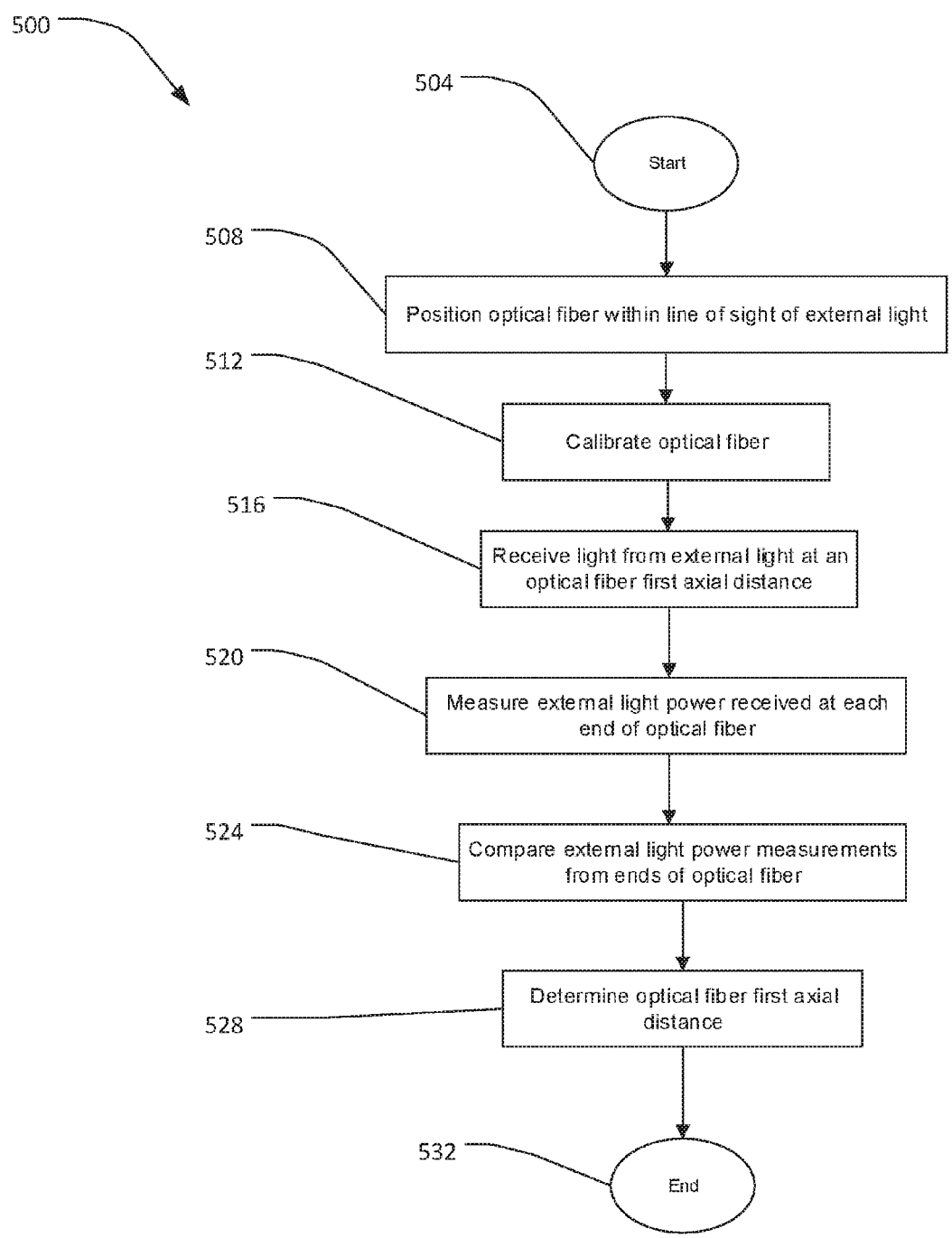
FIG. 5 provides a flow chart of a method of use of the optical fiber sensor system of FIG. 2.

FIG. 5 provides a flow chart illustrating an exemplary method of use of the optical fiber sensor system of FIGS. 2 and 3. Generally, the method 500 starts at step 504 and ends at step 532.

At step 508, an optical fiber is positioned within line of sight of potential external light sources targeted for detection. The optical fiber may be mounted on or by an external structure. At step 512, the optical fiber is calibrated. The calibration comprises geometric calibration (such as measurement of the total length of the fiber optic), calibration of each of the paired photo detectors disposed at each end of the optical fiber, and calibration of measured photo detector light powers for known locations and/or known power of light sources (such as axial distance from fiber optic) and of known types of light sources (e.g. visible band light sources, IR sources, etc.).

At step 516, light is received by the diffusive optical fiber at a first axial distance. The received light passes through fiber optical cladding and propagates to each end of the optical fiber. At step 520, each of the paired photo detectors disposed at each end of the optical fiber measures a detected light power. At step 524, the pair of photo detector measurements are compared, along with calibration data (such as total length of optical fiber). At step 528, the comparison data of step 524 is used to determine the first axial distance of the external light source. The method 500 ends at step 532.

In some embodiments, optical transceivers replace the optical detectors at the fiber ends. In some embodiments, the diffusive optical fiber is configured as an omnidirectional free space optical transceiver module to send/receive optical signals between the fiber ends and any other optical signal module within line of sight; such an embodiment may be applied to, e.g. to Li-Fi, optical remote control devices, etc.

In some embodiments, the received or detected external or ambient light comprises more than one wavelength, e.g. both visible band and IR band. In some embodiments, the diffusive fiber has a defined or limited diffusive axial portion with the remaining a regular or normal (non-diffusive) fiber optic. In some embodiments, one or more external sensors are employed to assist or complement the detection and/or location calculation of an external light. For example, a temperature sensor or a humidity sensor may assist in processing of received light to, for example, improve signal/noise ratio thresholds and/or improve signal processing by the system's 100 signal processor/controller 500. In some embodiments, the system 100 is configured to determine kinematic data of a light source, such as velocity and acceleration.

In one embodiment, the system 100 comprises its own power supply, such as a battery such as a lithium battery, so as to power the photo detectors 400 and/or signal processor/controller 500.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided fiber optic light sensing and communication. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. An optical fiber sensor system comprising:
a first optical fiber sensor system comprising:
a first optical fiber comprising:
a first end;
a second end; and
a first external surface forming a first aperture between the first end and the second end, the first optical fiber to receive an external light from an external light source through the first external surface at a first axial distance along the first external surface;
a first detector disposed at the first end of the first optical fiber and to measure a first external light power;
a second detector disposed at the second end of the first optical fiber and to measure a second external light power;
a second optical fiber sensor system disposed orthogonally to the first optical fiber sensor system, the second optical fiber sensor system comprising:
a second optical fiber comprising:
a third end;
a fourth end; and
a second external surface forming a second aperture between the third end and the fourth end, the second optical fiber to receive the external light from the external light source through the second external surface at a second axial distance along the second external surface,
a third detector disposed at the third end of the second optical fiber to measure a third external light power;
a fourth detector disposed at the fourth end of the second optical fiber to measure a fourth external light power;
a third optical fiber sensor system comprising:
a third optical fiber disposed orthogonally to both the first optical fiber sensor system and the second optical fiber sensor system, the third optical fiber sensor system comprising:
a fifth end;
a sixth end; and
a third external surface forming a third aperture between the fifth end and the sixth end, the third optical fiber to receive the external light from the external light source through the third external surface at a third axial distance along the third external surface;
a fifth detector disposed at the fifth end of the third optical fiber and to measure a fifth external light power;
a sixth detector disposed at the sixth end of the third optical fiber to measure a sixth external light power; and
a processor to:
compare the first and the second external light power measurements and determine the first axial distance;
compare the third and the fourth external light power measurements and determine the second axial distance;
compare the fifth and the sixth external light power measurements and determine the third axial distance; and
determine a three-dimensional position of the external light source based on the first axial distance, the second axial distance, and the third axial distance relative to a position of the first optical fiber sensor system to the second optical fiber sensor system, and the third optical sensor system.

2. The system of claim 1, wherein the first optical fiber is a diffusive optical fiber.

3. The system of claim 2, wherein the first optical fiber forms a circular axial cross-section.

4. The system of claim 2, wherein the first end is a first terminus of the first optical fiber and the second end is a second terminus of the first optical fiber.

5. The system of claim 4, wherein the first optical fiber is a homogeneous optical fiber of circular axial cross-section.

6. The system of claim 4, further comprising a pair of transceivers disposed at each terminus of the first optical fiber, the pair of transceivers to receive an optical signal from the external light source and to transmit an optical signal to the external light source.

7. The system of claim 1, wherein each of the first optical fiber and the second optical fiber form longitudinally straight structures.

8. A method of fiber optic sensing of a light source comprising:
providing a sensor system comprising:
a first optical fiber sensor system comprising:
a first optical fiber comprising:
a first end;
a second end; and
a first external surface forming a first aperture between the first end and the second end, the first optical fiber to receive an external light from an external light source through the first external surface at a first axial distance along the first external surface;
a first detector disposed at the first end of the first optical fiber and to measure a first external light power;
a second detector disposed at the second end of the first optical fiber and to measure a second external light power;
a second optical fiber sensor system disposed orthogonally to the first optical fiber sensor system, the second optical fiber sensor system comprising:
a second optical fiber comprising:
a third end;
a fourth end; and
a second external surface forming a second aperture between the third end and the fourth end, the second optical fiber to receive the external light from the external light source through the second external surface at a second axial distance along the second external surface,
a third detector disposed at the third end of the second optical fiber to measure a third external light power;
a fourth detector disposed at the fourth end of the second optical fiber to measure a fourth external light power;
and
a third optical fiber sensor system comprising:
a third optical fiber disposed orthogonally to both the first optical fiber sensor system and the second optical fiber sensor system, the third optical fiber sensor system comprising:
a fifth end;
a sixth end; and
a third external surface forming a third aperture between the fifth end and the sixth end, the third optical fiber to receive the external light from the external light source through the third external surface at a third axial distance along the third external surface;
a fifth detector disposed at the fifth end of the third optical fiber and to measure a fifth external light power;
a sixth detector disposed at the sixth end of the third optical fiber to measure a sixth external light power; and
a processor;
receiving the external light through the first external surface at a first axial distance along the first external surface;
measuring, by the first detector, the first external light power;
measuring, by the second detector, the second external light power;
comparing, by the processor, the first and the second external light power measurements;
based on the comparison of the first and the second external light power measurements, determining, by the processor, the first axial distance;
measuring, by the third detector, the third external light power;
measuring, by the fourth detector, the fourth external light power;
comparing, by the processor, the third and the fourth external light power measurements;
based on the comparison of the third and the fourth external light power measurements, determining, by the processor, the second axial distance;
measuring, by the fifth detector, the fifth external light power;
measuring, by the sixth detector, the sixth external light power;
comparing, by the processor, the fifth and the sixth external light power measurements;
based on the comparison of the fifth and the sixth external light power measurements, determining, by the processor, the third axial distance; and
based on the first axial distance, the second axial distance, and the third axial distance, determining, by the processor, a three-dimensional location for the external light source.

9. The method of claim 8, wherein the first optical fiber is a diffusive optical fiber.

10. The method of claim 9, wherein the first optical fiber forms a circular axial cross-section.

11. The method of claim 9, wherein the first end is a first terminus of the first optical fiber and the second end is a second terminus of the first optical fiber.

12. The method of claim 11, wherein the first optical fiber is a homogeneous optical fiber of circular axial cross-section.

13. The method of claim 12, wherein each of the first optical fiber and the second optical fiber form longitudinally straight structures.

14. The method of claim 11, further comprising a pair of transceivers disposed at each terminus of the optical fiber, the pair of transceivers to receive an optical signal from the external light source and to transmit an optical signal to the external light source.

* * * * *

UNITED STATES PATENT AND TRADEMARK OFFICE
CERTIFICATE OF CORRECTION

PATENT NO. : 9,970,746 B2  
APPLICATION NO. : 15/172411  
DATED : May 15, 2018  
INVENTOR(S) : Jiayin Ma et al.

Page 1 of 1

It is certified that error appears in the above-identified patent and that said Letters Patent is hereby corrected as shown below:

In the Claims

Claim 1, Column 12, Line 57, delete "system to" and insert --system, to-- therein.

Signed and Sealed this
Ninth Day of July, 2019

Andrei Iancu
*Director of the United States Patent and Trademark Office*